UNITED STATES PATENT OFFICE.

GEORGE LEONARD COLLORD, OF PITTSBURGH, PENNSYLVANIA.

ROAD-SURFACING MATERIAL.

1,361,140.  Specification of Letters Patent. Patented Dec. 7, 1920.

No Drawing.  Application filed August 16, 1919. Serial No. 317,898.

*To all whom it may concern:*

Be it known that I, GEORGE L. COLLORD, residing at Pittsburgh, in the county of Allegheny and State of Pennsylvania, a citizen of the United States, have invented or discovered certain new and useful Improvements in Road-Surfacing Materials, of which improvements the following is a specification.

It has been the custom to form roads of crushed rock, slag, etc., and apply to the bed thus formed a thin layer of finely ground materials of the same or other suitable composition. In order to prevent the small particles being dislodged and blown away, water, oil, tar, or other binding material is mixed with the finely ground surface coating. Experience has shown that when water is used, it will rapidly evaporate leaving the surface material in such condition that the particles will be lifted by the wheels of vehicles and blown away off the roadway. While oil, tar, etc. will form a more permanent binder, it has been found that they become more or less plastic in hot weather so that the surface material will flow and become wavy, especially on inclined portions of the road. By reason of this movement the surface coating will become so thin at certain portions of the road bed that it will be broken by the wheels of vehicles.

In lieu of the types of materials above mentioned, calcium chlorid has been employed. This material is applied either in a dry state, and the material in a short time absorbs sufficient moisture from the atmosphere, or the material may be dissolved in water and distributed over the surface of the road. The material has been found efficient as a surfacing material or as a binder and on account of the hygroscopic qualities, will absorb sufficient moisture to prevent dust. But as it is applied in a practically pure state as a surfacing material, or mechanically mixed with broken material, it will deliquesce when the humidity of the atmosphere is high and during rains and will gradually flow or be washed from the road surface and from between the broken pieces of material.

The object of the invention described herein is to provide a surfacing material for roads consisting of a solid composite material having one of the components hygroscopic or capable of absorbing sufficient moisture from the atmosphere to prevent the formation of dust on the disintegration of the material by vehicles. The invention is hereinafter more fully described and claimed.

In the practice of the invention I employ a low grade calcareous material, *i. e.*, a material composed of a plurality of substances which will not be destructively effected by moisture and preferably non-absorbent, and having one or more components of such a character that when chemically treated as hereinafter described, a hygroscopic material will be formed *in situ* and as intimately incorporated with or coherent to the other components as the original component or components. Blast furnace slag, low grade limestone, dolomite, etc. which contain, in addition to a calcium compound, a large percentage of silica or alumina or compound thereof, and other substances or compounds, which are not soluble in water and will not disintegrate when wet, have been found to be well adapted for the practice of the invention and are included herein under the term low grade calcareous material.

The slag, limestone, or dolomite is crushed up or broken up into small lumps of a size usually used in forming the surface layer or coating for roads and these lumps or pieces are then subjected to the action of hydrochloric acid which will combine with the calcium compound in the lumps forming calcium chlorid. As it is not desired to convert all of the calcium compound, only sufficient hydrochloric acid is added to affect calcium compound on the surfaces of the lumps or pieces or adjacent to the surfaces. It has been found that by employing a dilute solution of the acid, *e. g.*, one of acid to three of water, and mixing the solution with the lumps in the proportion of eighty parts of the calcareous material and twenty parts of the solution, a sufficient percentage of hygroscopic material will be formed to keep the whole mass so moist that the mechanical disintegration of the surfacing material will not result in dust.

It is characteristic of the improved material that in a layer spread on a road there will not be any free deliquescing material, *i. e.*, segregated from the other components of the lumps or pieces, but such material will be incorporated with or firmly coherent to other substances in the lumps or pieces, and hence though heavy rains may wash away the surfaces of the deliquescing material, such washing action will be slow. When by such washing action the percentage of hygroscopic material is reduced to such an extent that there is not sufficient moisture in the layer to prevent the formation of dust, the layer may be sprinkled with a hydrochloric acid, preferably in the form of a solution, thereby effecting the formation of additional hygroscopic material.

It will be understood that the percentage of hygroscopic, i. e., material formed in or on the lumps or pieces, can be increased or diminished by varying the percentage of hydrochloric acid, preferably in the form of a solution, mixed with a given amount of the low grade calcareous material.

It will be understood that the transformation of the calcareous material or a portion thereof into a hygroscopic material does not materially affect the integral character of the lumps or pieces as the calcium chlorid will adhere to the other substances with which the original calcareous material was intermingled.

I claim herein as my invention:

1. A material for surfacing roads formed of integral lumps or pieces consisting of intermingled hygroscopic and non-hygroscopic substances coherent the one to the other.

2. A material for surfacing roads formed of integral lumps or pieces consisting of intermingled hygroscopic substances and substances insoluble in water, said substances cohering one to the other.

3. A material for surfacing roads formed of integral lumps or pieces consisting of chlorid of calcium intermingled with and coherent to non-hygroscopic substances.

4. A material for surfacing roads formed of integral lumps or pieces consisting of chlorid of calcium and compounds of silica and alumina, said substances cohering one to the other.

5. The method of forming a material for surfacing roads which consists in breaking a low grade calcerous material into pieces or lumps of suitable size and treating such lumps or pieces with hydrochloric acid.

6. The method of forming a material for surfacing roads which consists in breaking blast furnace slag into lumps or pieces of suitable size and treating such lumps or pieces with hydrochloric acid.

7. The method herein described which consists in breaking a low grade calcareous material into lumps or pieces and spreading such pieces to form a layer of suitable depth and sprinkling such layer with hydrochloric acid.

In testimony whereof, I have hereunto set my hand.

GEORGE LEONARD COLLORD.